US012413691B2

(12) United States Patent
Cheung et al.

(10) Patent No.: US 12,413,691 B2
(45) Date of Patent: Sep. 9, 2025

(54) VIDEO TRANSMISSION APPARATUS, VIDEO MONITORING APPARATUS, AND METHOD OF PERFORMING THE SAME

(71) Applicant: HANWHA VISION CO., LTD., Seongnam-si (KR)

(72) Inventors: Sweung Won Cheung, Seongnam-si (KR); Young Ho Kim, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 104 days.

(21) Appl. No.: 18/579,351

(22) PCT Filed: Jul. 18, 2022

(86) PCT No.: PCT/KR2022/010441
§ 371 (c)(1),
(2) Date: Jan. 14, 2024

(87) PCT Pub. No.: WO2023/003298
PCT Pub. Date: Jan. 26, 2023

(65) Prior Publication Data
US 2024/0348750 A1     Oct. 17, 2024

(30) Foreign Application Priority Data
Jul. 19, 2021   (KR) .................. 10-2021-0094243

(51) Int. Cl.
G11B 27/10    (2006.01)
G11B 27/00    (2006.01)
H04N 7/18     (2006.01)

(52) U.S. Cl.
CPC .......... *H04N 7/183* (2013.01); *G11B 27/005* (2013.01); *G11B 27/10* (2013.01)

(58) Field of Classification Search
CPC ....... H04N 7/183; G11B 27/005; G11B 27/10
See application file for complete search history.

(56) References Cited

U.S. PATENT DOCUMENTS 9,892,606 B2 *   2/2018  Venetianer ....... G08B 13/19652
10,726,274 B1 *  7/2020  Hasegawa ............. H04N 7/181
(Continued)

FOREIGN PATENT DOCUMENTS

KR   10-196125881 B1   9/2014
KR   10-2017-0096838 A  8/2017
(Continued)

*Primary Examiner* — Thai Q Tran
*Assistant Examiner* — Jose M Mesa
(74) *Attorney, Agent, or Firm* — McLean IP Global; Jason Y. Pahng (57) ABSTRACT

Provided is a video transmission apparatus including a processor and a memory that stores instructions executable by the processor. The instructions executed by the processor includes, storing a plurality of video data captured by a camera, receiving a search request from a video monitoring apparatus connected to the video transmission apparatus through a network, searching the video data and extracting a plurality of video fragments that satisfy the received search request, generating a transmission packet comprising the extracted video fragments, and transmitting the generated transmission packet to the video monitoring apparatus, wherein the video fragments are respectively extracted from different, individually stored video data.

20 Claims, 9 Drawing Sheets

(56) References Cited

U.S. PATENT DOCUMENTS

| | | | | |
|---|---|---|---|---|
| 2007/0140647 | A1* | 6/2007 | Kusunoki | H04N 19/44 348/E7.071 |
| 2016/0173954 | A1* | 6/2016 | Speelmans | H04N 21/262 725/116 |
| 2018/0261401 | A1* | 9/2018 | Vilatela | H01G 11/36 |
| 2020/0195835 | A1* | 6/2020 | Chowdhery | H04N 7/188 |

FOREIGN PATENT DOCUMENTS

| | | |
|---|---|---|
| KR | 10-2019-0088731 A | 7/2019 |
| KR | 10-2019-0092227 A | 8/2019 |
| KR | 10-2021-0067065 A | 6/2021 |

\* cited by examiner

VIDEO TRANSMISSION APPARATUS, VIDEO MONITORING APPARATUS, AND METHOD OF PERFORMING THE SAME

This application is a national stage application, filed under 35 U.S.C § 371, of international patent application number PCT/KR2022/010441, filed on Jul. 18, 2022, which is hereby incorporated by reference in its entirety. In addition, this application claims priority from Korean application number 10-2021-0094243, filed on Jul. 19, 2021, which is hereby incorporated by reference in its entirety.

TECHNICAL FIELD

The present disclosure relates to a video transmission apparatus which stores a video captured by a camera and a video monitoring apparatus which receives and plays back the stored video.

BACKGROUND ART

Videos stored in existing video surveillance systems can be played back remotely through real time streaming protocol/real-time transport protocol (RTSP/RTP) over websocket. However, RTSP/RTP servers usually support the playback of only one video instead of multiple videos due to their performance limitations. In particular, existing camera systems support the playback of a video of one channel among stored videos due to internal performance limitations.

In this regard, for streaming services on the Internet, moving picture experts group-dynamic adaptive streaming over hypertext transfer protocol (MPEG-DASH) is being spread as a base technology for over-the-top video (OTT-V).

In MPEG-DASH, for example, media presentation description (MPD) as metadata including attribute information for optimally selecting streams with different characteristics from the same source is notified from a server that distributes a stream to a client that receives the stream, and the client uses the MPD. Accordingly, network environment adaptive streaming is realized.

That is, in MPEG-DASH, a server prepares a plurality of streams having the same content but different image qualities, image sizes, etc. according to the communication environment of a distribution path or the capabilities or status of a client. Meanwhile, the client may adaptively select a stream that it can receive and that is suitable for its capabilities (decoding ability, etc.) from among the streams prepared by the server and then may receive and play the stream.

Storing content in the MPEG-DASH format as described above is advantageous for transmitting multiple videos in real time in response to a client's request. However, when a large amount of video must be continuously stored in a limited environment as in the case of a surveillance camera, storing content in the MPEG-DASH format may cause a reduction in storage efficiency due to excessive capacity overhead.

An example of a conventional apparatus or network camera that transmits video in the MPEG-DASH format is an apparatus for variably providing video data pre-encoded to various qualities for the same video. The video transmission apparatus stores a plurality of video data obtained by encoding the same video in high-resolution, medium-resolution, and low-resolution formats in storage. Here, the video transmission apparatus breaks video data of an appropriate resolution among the video data into video fragments and transmits the video fragments in response to a streaming request from a client apparatus. If a change occurs in the network environment or resources of the client apparatus during the transmission, the video transmission apparatus breaks video data of another resolution into video fragments and transmits the video fragments in real time. Therefore, since a plurality of video fragments having different resolutions can be included and transmitted in a transmission packet, the client apparatus can be guaranteed seamless video reception even if the resolution of the video changes.

However, such a conventional video transmission apparatus pre-encodes a plurality of video data and transmits video data of a variable resolution at the request of the client apparatus. If the client apparatus is a video monitoring apparatus, it may want to receive a plurality of video fragments that meet specific search conditions in real time rather than simply receiving a specific video. However, the video transmission apparatus cannot secure pre-encoded video data in advance because it cannot know in advance what search conditions will be required by the video monitoring apparatus. Therefore, there is a need to immediately generate a plurality of video fragments that meet the search conditions at the time of inputting the search conditions, extract the video fragments that meet the search conditions from a plurality of different video data, and provide the extracted video fragments to the client apparatus.

DISCLOSURE

Technical Problem

An aspect of the present disclosure is to enable simultaneous and efficient monitoring of multiple surveillance videos of different times/dates, events, metadata, trick plays, etc. without storage capacity overhead.

Another aspect of the present disclosure is to enable simultaneous playback of multiple videos from a single camera storage apparatus and enable trick play using an HTTP2 protocol and a moving picture experts group-dynamic adaptive streaming over hypertext transfer protocol (MPEG-DASH) standard file format for web standard video playback.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

Technical Solution

According to an aspect of the present disclosure, there is provided a video transmission apparatus including a processor and a memory that stores instructions executable by the processor, wherein the instructions executed by the processor comprise: storing a plurality of video data captured by a camera; receiving a search request from a video monitoring apparatus connected to the video transmission apparatus through a network, searching the video data and extracting a plurality of video fragments that satisfy the received search request; generating a transmission packet comprising the extracted video fragments; and transmitting the generated transmission packet to the video monitoring apparatus, wherein the video fragments are respectively extracted from different, individually stored video data.

The transmission of the generated transmission packet comprises continuously transmitting the extracted video fragments to the video monitoring apparatus in a server push method.

The extracted video fragments are removed and the extracted video fragments are not stored in the video transmission apparatus after being transmitted, and if there is a second search request after the search request, a plurality of video fragments corresponding to the second search request are extracted accordingly.

The stored video data is in a video storage format comprising a header and a payload.

Each of the video fragments comprises a fragment header and a segment video.

The generation of the transmission packet comprises adding a header of the stored video data in front of the video fragments.

The search request comprises a plurality of search times related to the video data. The extraction of the video fragments comprises extracting a plurality of video fragments from the video data corresponding to the search times. The video fragments are extracted from a plurality of video data stored at different times or on different dates.

The search request comprises a specific event related to the video data, and the extraction of the video fragments comprises extracting a plurality of video fragments from the video data in which the specific event occurs.

The search request comprises metadata information about the video data, and the extraction of the video fragments comprises extracting a plurality of video fragments from the video data that satisfy the metadata information.

The search request comprises a trick play request comprising at least one of seek, speed change, step forward and step backward. The extraction of the video fragments comprises extracting a plurality of video fragments corresponding to the trick play request, and the video fragments are extracted from single video data.

According to another aspect of the present disclosure, there is provided a video monitoring apparatus including a processor and a memory that stores instructions executable by the processor, wherein the instructions executed by the processor comprise: transmitting a search request to a video transmission apparatus connected to the video monitoring apparatus through a network; receiving a transmission packet comprising a plurality of video fragments from the video transmission apparatus as a response to the search request; and playing back the video fragments included in the received transmission packet, wherein the video fragments are extracted from different, individually stored video data and included in the transmission packet.

The receiving of the video fragments comprises continuously receiving the video fragments from the video transmission apparatus in a server push method.

Each of the video fragments comprises a fragment header and a segment video.

The instructions further comprise decoding the video fragments using a video decoder embedded in a web browser.

The instructions further comprise, when the video fragments cannot be decoded by a video decoder embedded in a web browser, decoding the video fragments using a separate video decoder; and rendering the decoded video fragments using a video renderer embedded in the web browser.

The instructions further comprise displaying a graphical user interface (GUI) for receiving the search request from a user, and the GUI allows the user to select at least one of a plurality of search times, an event, metadata, and a trick play on one screen.

The GUI simultaneously displays a plurality of videos corresponding to the video fragments on one screen.

According to another aspect of the present disclosure, there is provided a video transmission method in an apparatus including a processor and a memory that stores instructions executable by the processor, the method being represented by the instructions and comprising: storing a plurality of video data captured by a camera; receiving a search request from a video monitoring apparatus connected to the video transmission apparatus through a network; searching the video data and extracting a plurality of video fragments that satisfy the received search request; generating a transmission packet comprising the extracted video fragments; and transmitting the generated transmission packet to the video monitoring apparatus, wherein the video fragments are respectively extracted from different, individually stored video data.

The search request comprises a plurality of search times related to the video data, the extraction of the video fragments comprises extracting a plurality of video fragments from the video data corresponding to the search times, and the video fragments are extracted from a plurality of video data stored at different times or on different dates.

The search request comprises a specific event related to the video data, and the extraction of the video fragments comprises extracting a plurality of video fragments from the video data in which the specific event occurs.

Advantageous Effects

According to the present disclosure, it is possible to simultaneously and efficiently monitor multiple surveillance videos of different times according to search conditions.

In addition, according to the present disclosure, it is possible to quickly play a desired stored video on the web by simultaneously playing multiple videos that satisfy specific search conditions in a CCTV video surveillance application. Accordingly, this increases accuracy and immersion in video surveillance and enables a more real-time response.

MODE FOR INVENTION

Advantages and features of the disclosure and methods to achieve them will become apparent from the descriptions of examples herein below with reference to the accompanying drawings. However, the inventive concept is not limited to examples disclosed herein but may be implemented in various ways. The examples are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the examples rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

In addition, the term "image" is used herein to encompass both a moving picture such as a video, and a still image.

Hereinafter, examples of the present disclosure will be described in detail with reference to the accompanying drawings.

Figure 1:
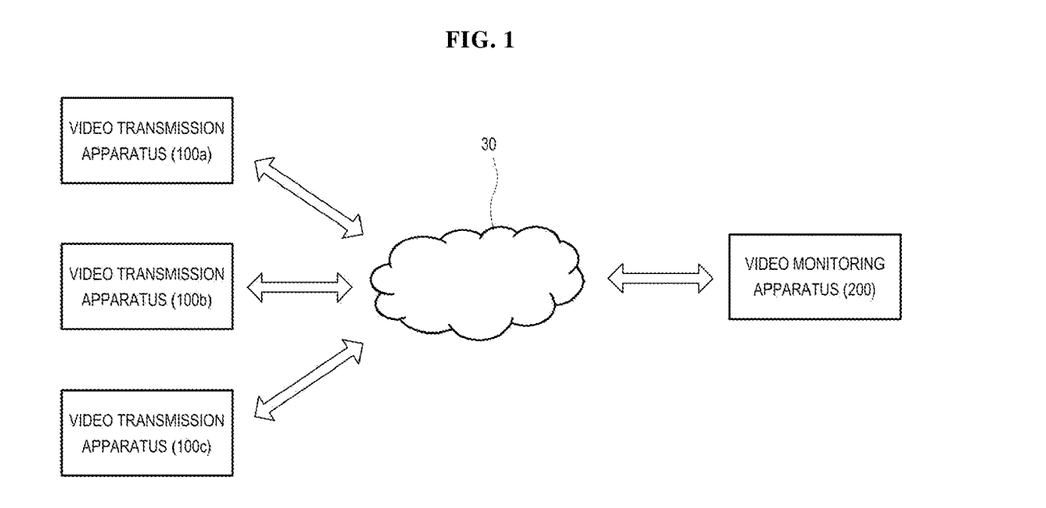
FIG. 1 illustrates a case where video transmission apparatuses and a video monitoring apparatus according to the present disclosure are connected on a network.

FIG. 1 illustrates a case where video transmission apparatuses and a video monitoring apparatus according to the present disclosure are connected on a network. The video monitoring apparatus 200 is communicatively connected to one or more video transmission apparatuses 100a through 100c through a network. The network can be connected not only to wired networks such as WAN and LAN, but also to wireless networks such as wireless LAN, wireless PAN, UWB, and cell networks. The video transmission apparatuses 100a through 100c are apparatuses for storing videos captured by a video capturing apparatus. The video transmission apparatuses 100a through 100c may be connected to the video capturing apparatus through a network to receive the captured videos or may be integrated with the video capturing apparatus. Therefore, the video transmission apparatuses 100a through 100c can be implemented in other forms, such as a network camera, a network video recorder (NVR) or a personal video recorder (PVR), as long as they have the function of storing the captured videos.

In addition, the video monitoring apparatus 200 is an apparatus for transmitting a search request to the video transmission apparatuses 100a through 100c through a network 30 or receiving video data from the video transmission apparatuses 100a through 100c. Therefore, the video monitoring apparatus 200 can be implemented as any apparatus that has the function of decoding and displaying the video data. The video monitoring apparatus 200 includes, for example, a video playback terminal such as a mobile phone equipped with a web browser, a PC or a TV and a monitoring system such as a video management system (VMS).

Figure 2:
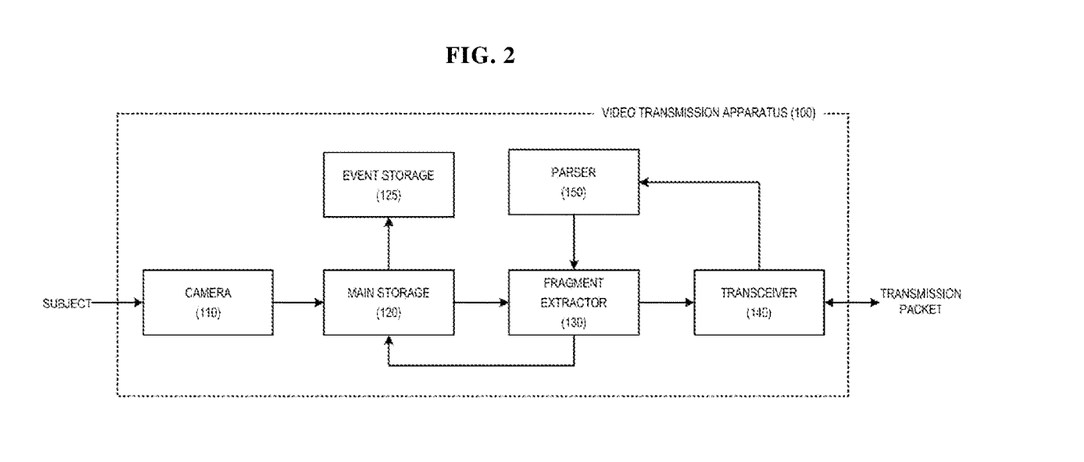
FIG. 2 is a block diagram of a video transmission apparatus according to the present disclosure.

FIG. 2 is a detailed block diagram of a video transmission apparatus 100 according to the present disclosure.

Figure 3:
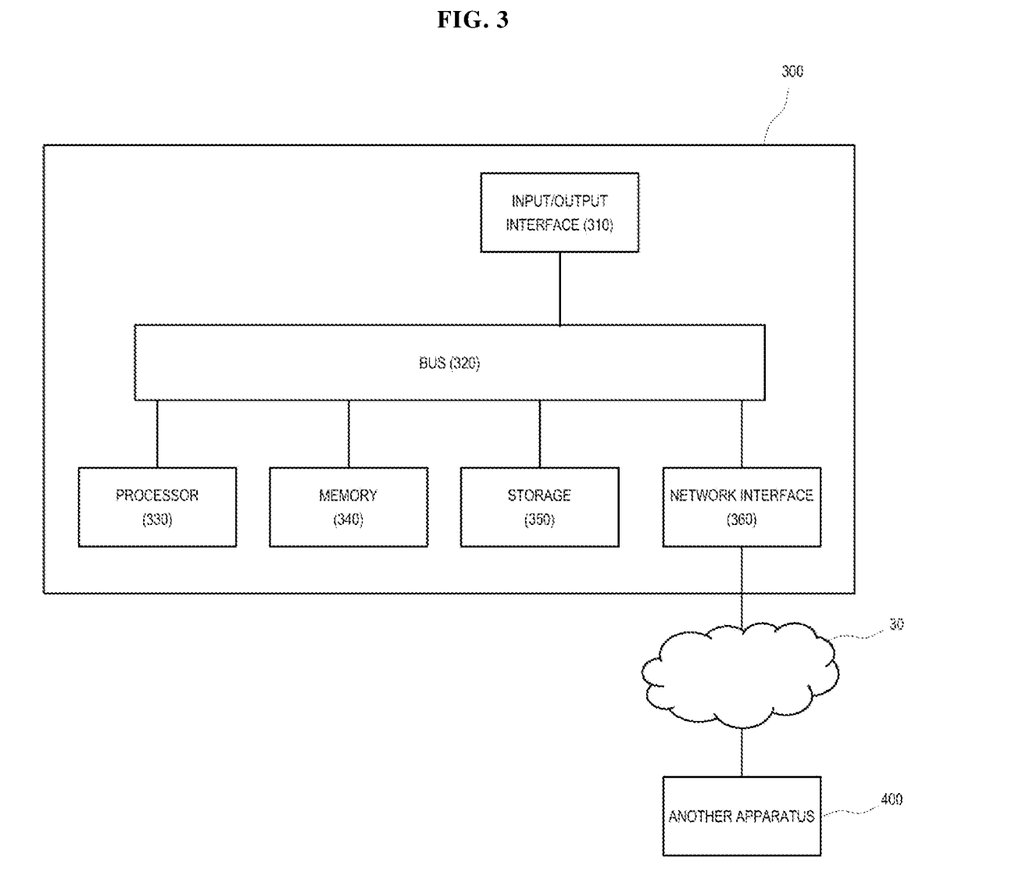
FIG. 3 is an example of a computing apparatus having the hardware configuration of a video transmission apparatus or a video monitoring apparatus according to the present disclosure.

The video transmission apparatus 100 may include a camera 110, a main storage 120, an event storage 125, a fragment extractor 130, a transceiver 140, and a parser 150. Specifically, FIG. 3 illustrates the hardware configuration of a computing apparatus 300 that realizes the video transmission apparatus 100.

The computing apparatus 300 has a bus 320, a processor 330, a memory 340, a storage 350, an input/output interface 310, and a network interface 360. The bus 320 is a data transmission path used by the processor 330, the memory 340, the storage 350, the input/output interface 310, and the network interface 360 to transmit and receive data to and from each other. However, a method of connecting the processor 330, etc. to each other is not limited to bus connection. The processor 330 is an arithmetic processing device such as a central processing unit (CPU) or a graphics processing unit (GPU). The memory 340 is a memory such as a random access memory (RAM) or a read only memory (ROM). The storage 350 is a storage device such as a hard disk, a solid state drive (SSD), or a memory card. The storage 350 may also be a memory such as a RAM or a ROM.

The input/output interface 310 is an interface for connecting the computing apparatus 300 to an input/output device. For example, a keyboard, a mouse, etc. are connected to the input/output interface 310.

The network interface 360 is an interface for communicatively connecting the computing apparatus 300 to an external apparatus. The network interface 360 may be a network interface for connection to a wired line or may be a network interface for connection to a wireless line. For example, the computing apparatus 300 may be connected to another computing apparatus 400 through a network 30.

The storage 350 stores program modules that implement each function of the computing apparatus 300. The processor 330 executes each of the program modules to implement each function corresponding to the program module. Here, when the processor 330 executes each module, it may read the modules into the memory 340 and then execute them.

However, the hardware configuration of the computing apparatus 300 is not limited to the configuration illustrated in FIG. 3. For example, each program module may be stored in the memory 340. In this case, the computing apparatus 300 does not need to include the storage 350.

As described above, the video transmission apparatus 100 includes at least the processor 330 and the memory 340 that stores instructions executable by the processor 330. In particular, the video transmission apparatus 100 of FIG. 2 is operated as instructions including various functional blocks or steps included in the video transmission apparatus 100 are executed by the processor 330.

The operation of functional blocks included in the video transmission apparatus 100 will now be described in detail with reference to FIG. 2. The camera 110 captures a video of a subject. To this end, the camera 110 may include an imaging device such as a charge coupled device (CCD) or a metal-oxide semiconductor (CMOS). The camera 110 may be embedded in the video transmission apparatus 100. However, the present disclosure is not limited thereto, and the video transmission apparatus 100 without the camera 110 may receive the captured video from an external camera connected through a network.

The main storage 120 stores a video captured by the camera 110 as video data. The video data can be stored in various known formats such as MP4, mkv, and avi. However, a case where the video data follows the MP4 standard will be described below as an example.

The fragment extractor 130 extracts the stored video data as a plurality of video fragments corresponding to a search request in response to the request from the video monitoring apparatus 200 connected through a network. Specific extraction may be performed as in the example illustrated in FIG. 4. First, video data 10 stored in the main storage 120 may include an MP4 header 11 and a payload 13, i.e., a video.

Figure 4:
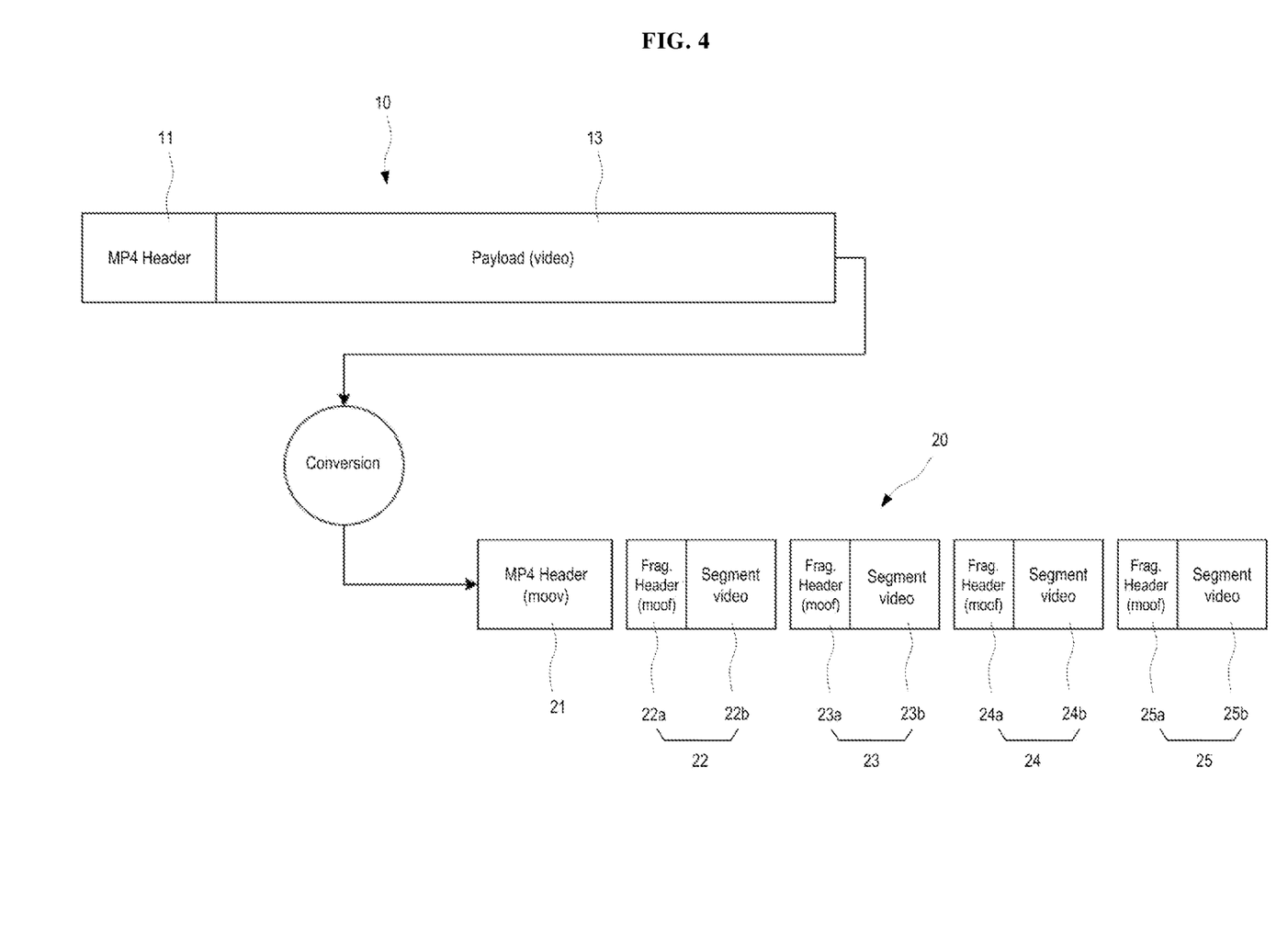
FIG. 4 illustrates the configuration of video data and a plurality of video fragments according to moving picture experts group-dynamic adaptive streaming over hypertext transfer protocol (MPEG-DASH)

The video data may be converted into a plurality of video fragments through an "extraction process." Specifically, a file format 20 of the video fragments is a structure in which an MP4 header 21, that is, the same header 11 as that of the video data 10 is added in front of a plurality of video fragments 22 through 25 that are repeatedly concatenated. The number of video fragments 22 through 25 may vary according to the size of a section that a user wishes to play.

Specifically, the MP4 header 21 may include an ftyp field and a moov field, and the moov field may be composed of an mvhd field, a video trak field and an mvex field.

The ftyp field defines that subsequently concatenated packets are moving picture experts group-dynamic adaptive streaming over hypertext transfer protocol (MPEG-DASH) segment files. In addition, the mvhd field defines general information related to the entire presentation, the trak field defines time and space information of media data, and the mvex field informs that a video fragment may exist in a corresponding file.

Each of the video fragments 22 through 25 following the MP4 header 21 is composed of a fragment header 22a, 23a, 24a or 25a and a segment video 22b, 23b, 24b or 25b as a payload. Each of the fragment headers 22a, 23a, 24a and 25a may correspond to the moof field, and the moof field may be composed of an mfra field and a video traf field. The detailed definitions of the above fields are specified in an MPEG-DASH standard document.

MPEG-DASH is a standard that enables dynamic adaptive streaming over HTTP. It works by breaking content into a sequence of small HTTP-based video fragments. Here, each of the video fragments includes a short interval of playback time of content that potentially lasts several hours, such as a movie or the live broadcast of a sport event. Since the content is made available at various bit rates, when the content is played back by an MPEG-DASH client, the client may use bit rate adaptation (ABR) to provide high-quality playback without causing pauses or rebuffering during the playback.

The video fragments converted into the MPEG-DASH format as described above may be multiplexed by the transceiver 140 before being transmitted to the video monitoring apparatus 200. In addition, the transceiver 140 may continuously transmit the multiplexed video fragments to the video monitoring apparatus 200 using a server push method.

For server push transmission, the transceiver 140 may include an HTTP2-based web server. The web server may perform multiplexing with a single TCP connection and generate multiple URLs in response to a request for multiple videos. In addition, the web server may transmit a plurality of video fragments to the video monitoring apparatus 200 through the URLs by applying an HTTP2 server push.

The HTTP2 push or server push indicates that the web server can send multiple responses to a single request from a web client. That is, the server may not only respond to the request, but also push additional resources to the client even when the client does not explicitly request them. In other words, since the web server already knows what resources the web client currently needs, it can immediately push a transmission packet even without a request from the web client. According to the server push, resources can be cached by the web client, reused in other pages, multiplexed together with other resources, prioritized by the web server, and even allowed for rejection by the web client.

As described above, the video transmission apparatus 100 may convert (extract) only some video data corresponding to a search request from a user of the video monitoring apparatus 200 among the video data stored in the main storage 120 into a plurality of MPEG-DASH-based video fragments and transmit the MPEG-DASH-based video fragments to the video monitoring apparatus 200 using the server push method. This method is clearly distinguished from a method (e.g., YouTube™) that pre-encodes video data into a plurality of MPEG-DASH-based video fragments and transmits the MPEG-DASH-based video fragments immediately.

In particular, surveillance cameras and NVRs inevitably have limitations in storage capacity despite a vast amount of video data that is stored. Therefore, if video data is stored in advance as a plurality of video fragments, capacity overhead due to many DASH headers cannot be avoided. Hence, the scheme of the present disclosure focuses on extracting and transmitting, in real time, only a required section of video data as a plurality of video fragments whenever a user makes a search request (immediately). Therefore, once transmitted, the video fragments extracted in response to the user's search request may be removed and the extracted video fragments are not stored in the video transmission apparatus 100. If there is a second request after the search request, a plurality of video fragments corresponding to the second request will be extracted/generated accordingly. This method may be somewhat disadvantageous in terms of response speed compared with the method of storing video data in advance as a plurality of video fragments, but may be advantageous in terms of storage efficiency and compatibility with existing surveillance cameras.

Referring again to FIG. 2, a search request from a user of the video monitoring apparatus 200 is received by the transceiver 140 and interpreted by the parser 150. Specifically, the user's search request may be formatted in the form of a search index including date, time, event type, metadata information, surveillance camera ID, and trick play type. Here, the event type refers to the classification of events present in video data obtained through video analytics, such as the appearance of a suspicious person, line crossing of a vehicle, fire occurrence, and collision situation. The metadata information is context information stored corresponding to the video data and may include object type (e.g., person, car, animal, etc.), object attributes (color, size, etc.), occurrence time, and object location in the video. In addition, the trick play refers to various video display methods such as seek, speed change, step forward, and step backward.

The parser 150 reads the search index and sends the result to the fragment extractor 130, and the fragment extractor 130 generates a plurality of video fragments by extracting only a section of the video data corresponding to the search index.

For example, if the user's search request includes a plurality of search times, the fragment extractor 130 generates a plurality of video fragments from the video data by extracting only sections corresponding to the search times. If the search times correspond to some sections of video data stored on different dates, the video fragments will be respectively extracted from the video data stored on the different dates.

Figure 5:
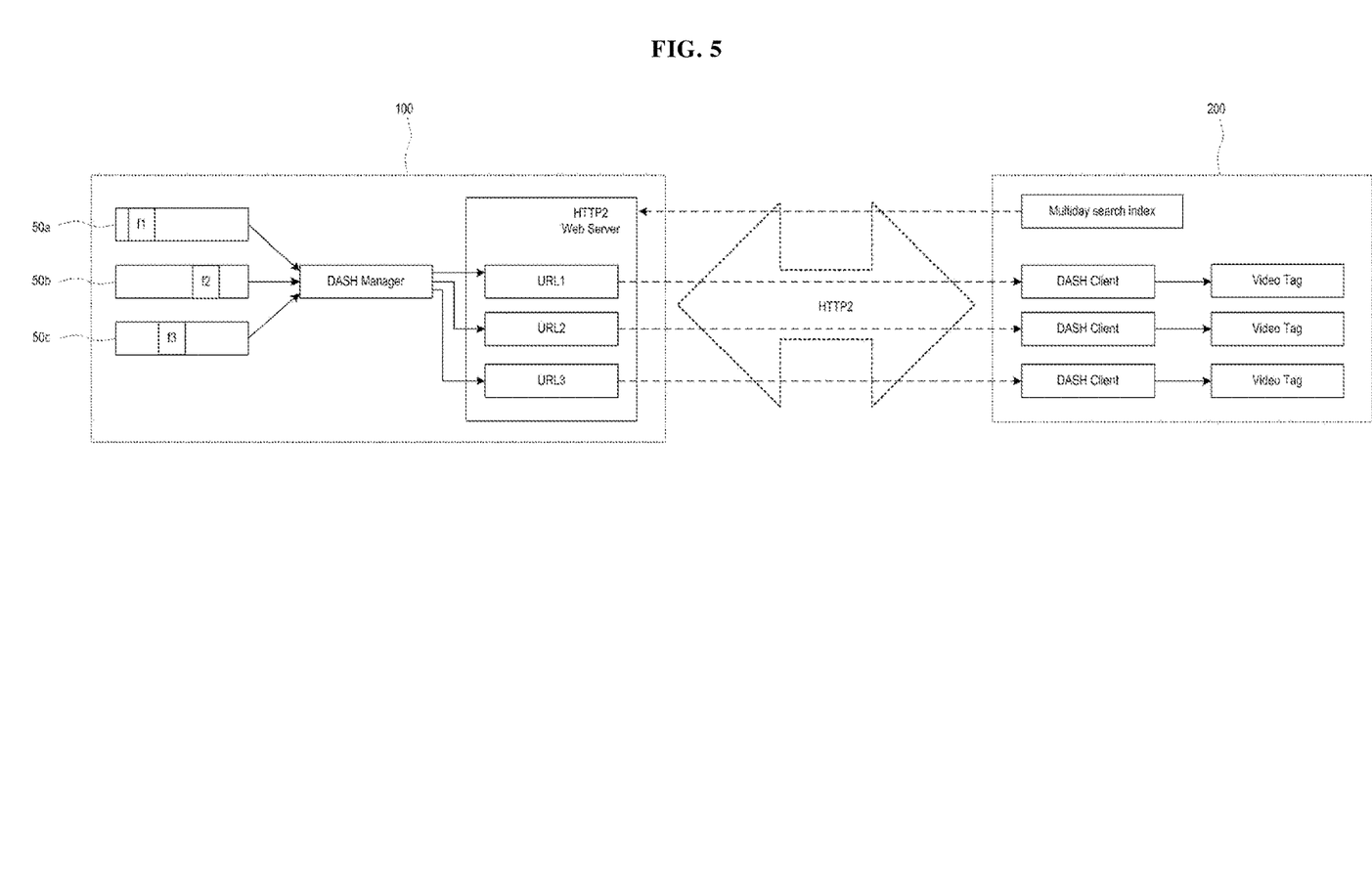
FIG. 5 illustrates an operation performed between a video transmission apparatus and a video monitoring apparatus in response to a search request for multiple dates.

FIG. 5 illustrates an operation performed between the video transmission apparatus 100 and the video monitoring apparatus 200 in response to a search request.

First, an HTTP2 web server included in the transceiver 140 receives a user's search request from the video monitoring apparatus 200. The search request may include a plurality of search times (or times and dates) related to the video data.

Accordingly, the fragment extractor 130 or a DASH manager searches different video data 50a, 50b and 50c stored on different dates or times, extracts a plurality of video fragments f1 through f3 corresponding to the requested time periods, and converts the video fragments f1 through f3 into the MPEG-DASH format. Here, the video fragments are parts of videos extracted from a plurality of video data stored at different times or on different dates. In addition, each of the extracted video fragments f1 through f3 may be transmitted to a client module (DASH client 1) of the video monitoring apparatus 200 through a corresponding channel, for example, URL1, by the web server included in the transceiver 140.

In addition to the search times, the search request may include other search conditions such as a specific event, metadata information, and a trick play request.

When the search request includes a specific event related to the video data, the fragment extractor 130 searches the video data and extracts a plurality of video fragments in which the specific event has occurred. In addition, when the search request includes metadata information about the video data, the fragment extractor 130 searches the video data and extracts a plurality of video fragments that satisfy the metadata information. Here, the video fragments may be respectively extracted from a plurality of different, individually stored video data.

In this case, the video fragments found based on the specific event may be transmitted by the web server to a client module (DASH client 2) of the video monitoring apparatus 200 through URL2 which is a different channel from URL1. In addition, the video fragments found based on the metadata information may be transmitted by the web server to a client module (DASH client 3) of the video monitoring apparatus 200 through URL3 which is another channel. Simultaneous transmission through multiple channels (URLs) may be performed over an HTTP2 protocol.

In this way, the video transmission apparatus 100 according to the present disclosure may simultaneously transmit a plurality of video fragments corresponding to different search requests through multiple channels. Accordingly, the video monitoring apparatus 200 may switch channels to allow a user watching a video stream (stream 1) including a plurality of video fragments that satisfy a specific time/date to watch a video stream (stream 2 or 3) including a plurality of other video fragments corresponding to a specific event or specific metadata information. Therefore, the user of the video monitoring apparatus 200 can easily watch a video corresponding to a specific search request, and also can switch to a video corresponding to a different search request and watch the video in real time.

When the search request is a trick play request (seek, speed change, step forward, step backward, etc.) related to the video data, the fragment extractor 130 extracts a plurality of video fragments corresponding to the trick play request. In this case, the video fragments may be extracted from single video data. For example, while the user of the video monitoring apparatus 200 is watching a video at a normal playback speed, if the user changes the search request to "step forward" for fast monitoring, the fragment extractor 130 may extract, from the single video data, only video frames that are jumped based on the specified speed of "step forward" as a plurality of video fragments. Accordingly, even if the user changes trick play conditions at any time, he or she can seamlessly watch the video at the corresponding changed rate from the video transmission apparatus 100.

The web server transmits the video fragments f1 through f3 in the MPEG-DASH format to DASH clients included in the video monitoring apparatus 200 through multiple URLs by using an HTTP2 server push method. The transmitted video fragments f1 through f3 in the MPEG-DASH format are decoded and made playable through a video decoder embedded in a web browser according to an HTML5 standard, that is, through a video tag. In order to avoid capacity overhead, the transmitted video fragments may be removed and the transmitted video fragments are not stored in the video transmission apparatus 100 after a certain capacity is exceeded or after a certain time has elapsed.

Figure 6:
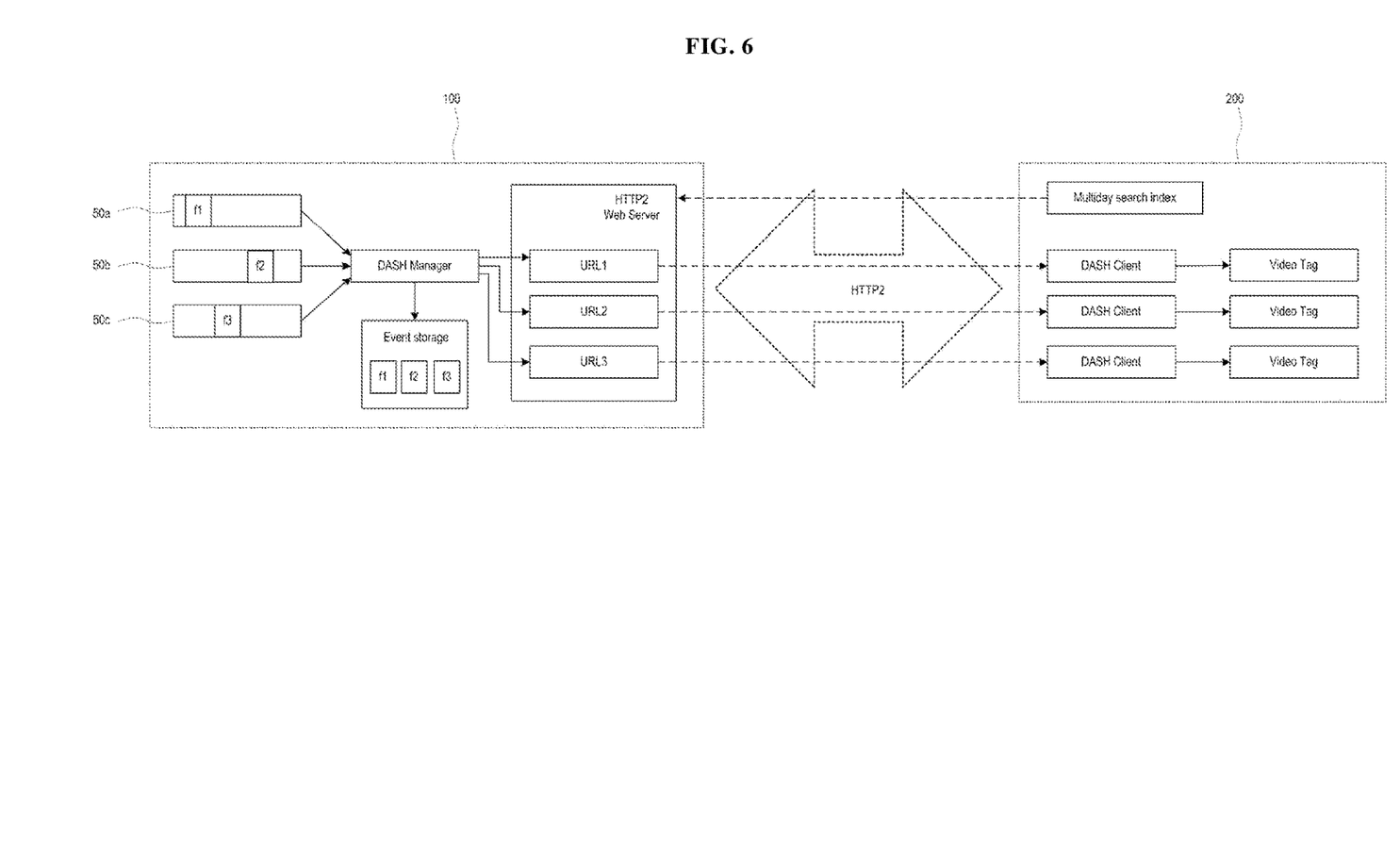
FIG. 6 illustrates a process in which a video corresponding to a user's search request is stored as event data in addition to FIG. 5.

An example in which not only a plurality of video fragments are transmitted as illustrated in FIG. 5, but also a video corresponding to a user's search request is separately stored as event data in the event storage 125 of the video transmission apparatus 100 as illustrated in FIG. 6 may also be considered. FIG. 6 is mostly similar to FIG. 5, but shows that a plurality of video fragments f1 through f3 in the MPEG-DASH format can be additionally stored in real time in the event storage 125 as well as being transmitted to the video monitoring apparatus 200.

Figure 7:
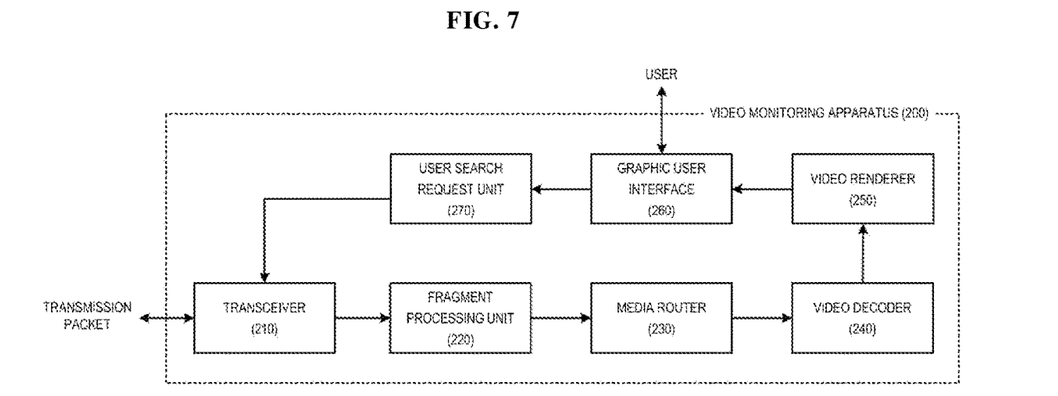
FIG. 7 is a block diagram of a video monitoring apparatus according to the present disclosure.

FIG. 7 is a detailed block diagram of a video monitoring apparatus 200 according to the present disclosure.

The video monitoring apparatus 200 may include a transceiver 210, a fragment processing unit 220, a media router 230, a video decoder 240, a video renderer 250, a graphical user interface (GUI) 260, and a user search request unit 270. Like the video transmission apparatus 100 described above, the video monitoring apparatus 200 may be implemented as a computing apparatus 300 as illustrated in FIG. 3 and may include a processor 330 and a memory 340 that stores instructions executable by the processor 330. In particular, the video monitoring apparatus 200 of FIG. 7 is operated as instructions including various functional blocks or steps included in the video monitoring apparatus 200 are executed by the processor 330.

Referring to FIG. 7, the user search request unit 270 generates a user's search request including a plurality of search times to the video transmission apparatus 100 connected through a network. Specifically, the user's search request may be formatted in the form of a search index including date/time, event type, metadata information, trick play type, and surveillance camera ID. Here, the event type refers to the classification of events present in video data obtained through video analytics, such as a wandering person, line crossing, fire occurrence, and collision situation. The metadata information refers to context information stored corresponding to the video data, such as object type, object attributes, occurrence time, and object location in the video. The trick play refers to various video display methods such as seek, speed change, step forward, and step backward.

The search index generated by the user search request unit 270 is transmitted to the video transmission apparatus 100 through the transceiver 210. As a response to the user's search request, the transceiver 210 receives a plurality of video fragments of a section corresponding to the user's request from the video transmission apparatus 100 in the form of a transmission packet. The video fragments may be in the format described above in FIG. 4. Reception of the video fragments may be continuously performed according to the HTTP2 server push method. In addition, the video fragments thus received may be additionally demultiplexed.

The fragment processing unit 220 removes a header of the video fragments according to the MPEG-DASH standard and merges the resulting video segments into a decodable file.

The video decoder 240 decodes the file. The video decoder 240 may include codecs according to various coding standards such as MPEG-2, VC-1, H.264, and HEVC. In another example, the video decoder 240 may be a decoder embedded in a web browser according to the HTML5 standard, that is, may be a video tag. However, the video tag cannot decode a video compressed using a codec such as HEVC. Therefore, in this case, decoding may be performed by a separate supported video decoder, and only the result may be transmitted to the video renderer 250.

The media router 230 may send the file to the video decoder 240 or directly provide the result of decoding performed by a separate video decoder to the video renderer 250 according to whether to support the video decoder 240. The video renderer 250 may be, for example, a renderer embedded in a web browser according to the HTML5 standard, that is, may be a canvas tag.

The GUI 260 may be displayed to the user together with the rendered video or may receive the user's search request described above and transmit it to the user search request unit 270.

Figure 8:
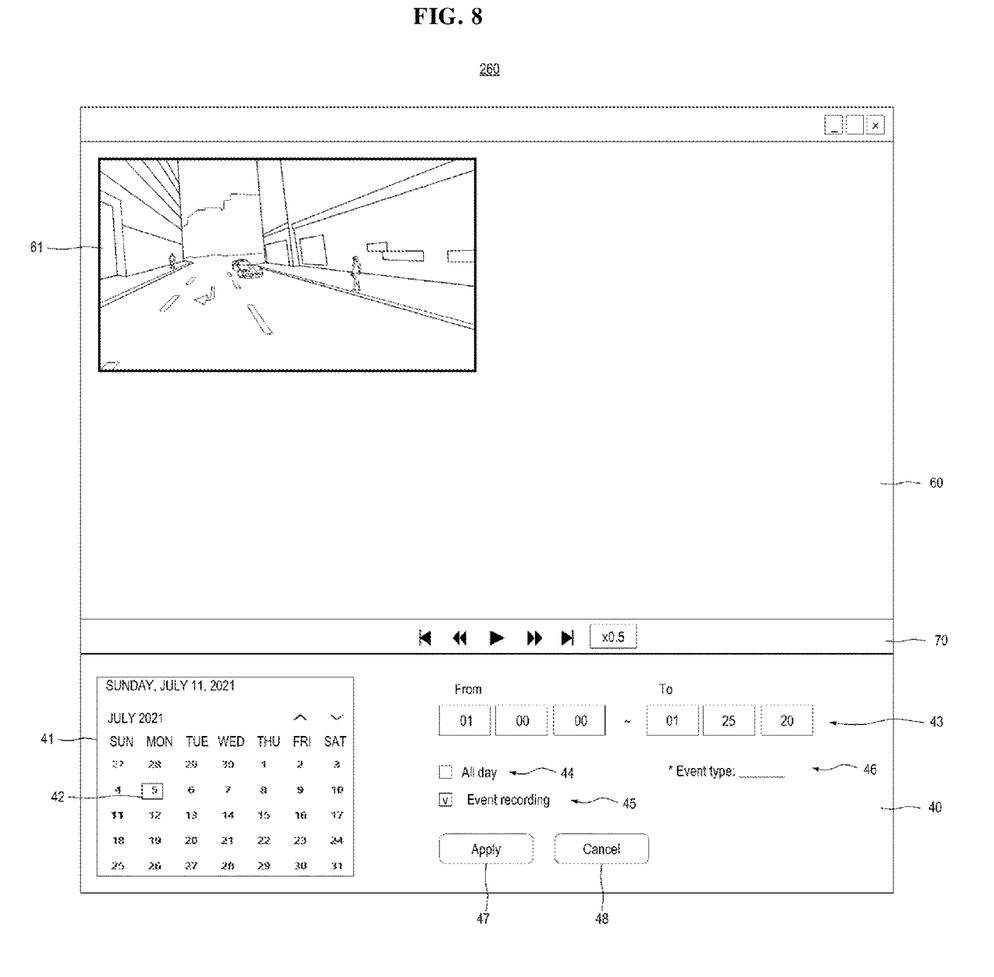
FIG. 8 illustrates a graphical user interface (GUI) according to the present disclosure.

FIG. 8 illustrates a GUI 260 according to the present disclosure. Referring to FIG. 8, the GUI 260 may include a video display area 60, a playback control area 70, and a user search request area 40.

First, a user may request the video monitoring apparatus 100 to provide videos for various desired dates and time periods by using the user search request area 40. For example, the user may select a random date 42 through a calendar 41 included in the user search request area 40 and input a time period 43 included in the user search request area 40. Then, when the user presses an Apply button 47, a user search request corresponding to the time period 43 is generated and transmitted to the video transmission apparatus 100. While inputting to the user search request area, the user may also initialize the input by pressing a Cancel button 48.

In addition, the user may check "all day" 44 on the specified date or "event recording" 45 for causing the video transmission apparatus 100 to store a requested video as an event. In addition, the user may request only specific events to be searched for by specifying event type 46 with or without the date/time condition. Alternatively, although not illustrated, the user may make a search request by specifying metadata information as context information about a video.

In response to the user's search request, the video transmission apparatus 100 may provide a plurality of video fragments according to MPEG-DASH to the video monitoring apparatus 200 as described above, and the video fragments may be decoded and displayed as a video thumbnail 61 in the video display area 60. Then, the user may perform a trick play on the displayed video by selecting various controls included in the playback control area 70. The trick play includes seek, speed change, step forward, and step backward.

Figure 9:
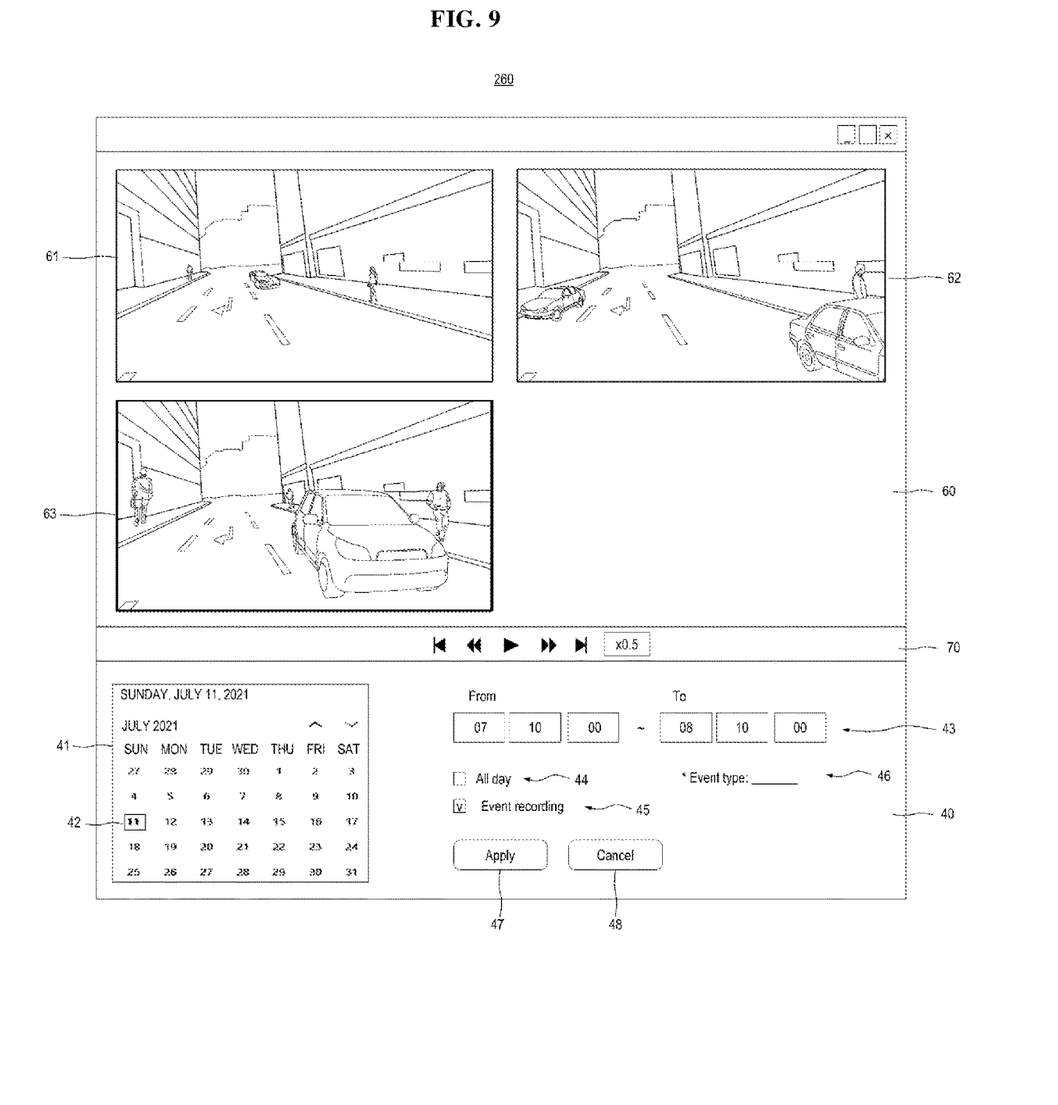
FIG. 9 illustrates an example in which videos for three different dates are displayed together on one screen.

After this, if the user wants to continuously request a video for another date, he or she can generate a search request in the same way. FIG. 9 illustrates an example in which videos 61 through 63 for three different dates are displayed together on one screen.

When the user selects another date 42 and another time 43 in the calendar 41, a thumbnail of the video 63 is displayed on the screen. Ultimately, the user can monitor a total of three videos 61 through 63 from the video transmission apparatus 100 through this operation.

Here, the currently activated third video 63 is displayed with a thick border or a border of a different color so that it can be distinguished from other videos. The user may perform a trick play on the third video 63 through the playback control area 70. If the user wants to monitor other videos 61 and 62 rather than the third video 63, he or she can select and activate the areas of the videos 61 and 62 and then perform a trick play.

As described above, the GUI 260 allows the user to select a plurality of search times (e.g., different dates) on one screen. This selection is transmitted to the video transmission apparatus 100 in the form of a user search request. Accordingly, a plurality of video fragments are extracted from corresponding sections of video data, and the extracted video fragments are transmitted to the video monitoring apparatus 200. Through this, the user can monitor a plurality of surveillance videos from different time periods on one screen in real time and perform a trick play on the surveillance videos being monitored.

Figure 10:
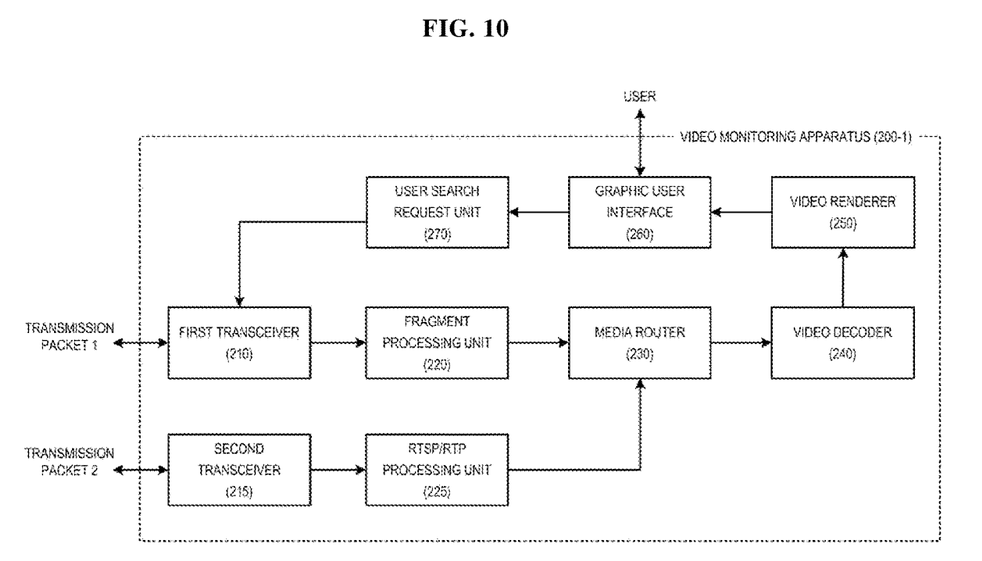
FIG. 10 is a block diagram of a video monitoring device according to an example of the present disclosure.

FIG. 10 is a block diagram of a video monitoring device 200-1 according to a modified example of FIG. 7. Referring to FIG. 10, a first transceiver 210, a fragment processing unit 220, a media router 230, a video decoder 240, a video renderer 250, a GUI 260, and a data request unit 270 are the same as those of FIG. 7. However, the video monitoring apparatus 200-1 provides not only a video reception function in the MPEG-DASH over HTTP2 method described above but also a video reception function in a real time streaming protocol/real-time transport protocol (RTSP/RTP) over websocket/HTTP method. For the latter function, the video monitoring apparatus 200-1 further includes a second transceiver 215 and an RTSP/RTP processing unit 225.

While the former function is advantageous for playing back multiple videos from multiple times/dates together, the latter function is advantageous for playing back a single video in more real time. To this end, the second transceiver 215 may be equipped with a websocket module to provide a function of processing a transmission packet of the websocket standard, and the RTSP/RTP processing unit 225 may include a function of providing a compressed real-time video by performing processing according to a real-time transmission protocol standard.

Each component described above with reference to FIGS. 2, 7 and 10 may be implemented as a software component, such as a task performed in a predetermined region of a memory, a class, a subroutine, a process, an object, an execution thread or a program, or a hardware component, such as a Field Programmable Gate Array (FPGA) or Application Specific Integrated Circuit (ASIC). In addition, the components may be composed of a combination of the software and hardware components. The components may reside on a computer readable storage medium or may be distributed over a plurality of computers.

And each block may represent a module, segment, or portion of code, which comprises one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Many modifications and other examples of the present disclosure will come to the mind of one skilled in the art having the benefit of the teachings presented in the foregoing descriptions and the associated drawings. Therefore, it is understood that the present disclosure is not to be limited to the specific examples disclosed, and that modifications and examples are intended to be included within the scope of the appended claims.

What is claimed is:

1. A video transmission apparatus comprising a processor and a memory that stores instructions executable by the processor, wherein the instructions executed by the processor comprise:
   storing one or more video data captured by a camera, wherein a majority of the video data is not stored in the form of a plurality of video fragments, and wherein a majority of the video data is not pre-encoded to more than one quality;
   receiving a search request from a video monitoring apparatus connected to the video transmission apparatus through a network;
   searching the video data and extracting in real time the plurality of video fragments from only a required section of the video data that satisfy the received search request;
   generating a transmission packet comprising the extracted video fragments; and
   transmitting the generated transmission packet to the video monitoring apparatus,
   wherein a first one of the video fragments is extracted from one set of the stored one or more video data, while a second one of the video fragments is extracted from another set of the stored video data.

2. The video transmission apparatus of claim 1, wherein the transmission of the generated transmission packet comprises continuously transmitting the extracted video fragments to the video monitoring apparatus in a server push method.

3. The video transmission apparatus of claim 1, wherein the extracted video fragments are removed and the extracted video fragments are not stored in the video transmission apparatus after being transmitted, and if there is a second search request after the search request, a plurality of video fragments corresponding to the second search request are extracted accordingly.

4. The video transmission apparatus of claim 1, wherein the stored video data is in a video storage format comprising a header and a payload.

5. The video transmission apparatus of claim 1, wherein each of the video fragments comprises a fragment header and a segment video.

6. The video transmission apparatus of claim 5, wherein the generation of the transmission packet comprises adding a header of the stored video data in front of the video fragments.

7. The video transmission apparatus of claim 1, wherein the search request comprises a plurality of search times related to the video data, the extraction of the video fragments from the video data comprises extracting a plurality of video fragments corresponding to the search times, and the video fragments are extracted from a plurality of video data stored at different times or on different dates.

8. The video transmission apparatus of claim 1, wherein the search request comprises a specific event related to the video data, and the extraction of the video fragments from the video data comprises extracting a plurality of video fragments in which the specific event occurs.

9. The video transmission apparatus of claim 1, wherein the search request comprises metadata information about the video data, and the extraction of the video fragments from the video data comprises extracting a plurality of video fragments that satisfy the metadata information.

10. The video transmission apparatus of claim 1, wherein the search request comprises a trick play request comprising at least one of seek, speed change, step forward and step backward, the extraction of the video fragments comprises extracting a plurality of video fragments corresponding to the trick play request, and the video fragments are extracted from single video data.

11. A video monitoring apparatus comprising a processor and a memory that stores instructions executable by the processor, wherein the instructions executed by the processor comprise:
   transmitting a search request to a video transmission apparatus connected to the video monitoring apparatus through a network, wherein one or more video data captured by a camera is stored in the video transmission apparatus and wherein a majority of the video data is not stored in the video transmission apparatus in the form of a plurality of video fragments;
   the plurality of video fragments being extracted, in real time by the video transmission apparatus, from only a required section of the video data that satisfy the search request;
   receiving a transmission packet comprising a plurality of video fragments from the video transmission apparatus as a response to the search request; and
   playing back the video fragments included in the received transmission packet,
   wherein a first one of the video fragments is extracted from one set of the stored one or more video data, while a second one of the video fragments is extracted from another set of the stored video data, and the first and the second one of the video fragments are included together in the transmission packet.

12. The video monitoring apparatus of claim 11, wherein the receiving of the video fragments comprises continuously receiving the video fragments from the video transmission apparatus in a server push method.

13. The video monitoring apparatus of claim 11, wherein each of the video fragments comprises a fragment header and a segment video.

14. The video monitoring apparatus of claim 11, wherein the instructions further comprise decoding the video fragments using a video decoder embedded in a web browser.

15. The video monitoring apparatus of claim 11, wherein the instructions further comprise, when the video fragments cannot be decoded by a video decoder embedded in a web browser,
   decoding the video fragments using a separate video decoder; and rendering the decoded video fragments using a video renderer embedded in the web browser.

16. The video monitoring apparatus of claim 11, wherein the instructions further comprise displaying a graphical user interface (GUI) for receiving the search request from a user, and the GUI allows the user to select at least one of a plurality of search times, an event, metadata, and a trick play on one screen.

17. The video monitoring apparatus of claim 16, wherein the GUI simultaneously displays a plurality of videos corresponding to the video fragments on one screen.

18. A video transmission method in an apparatus comprising a processor and a memory that stores instructions executable by the processor, the method being represented by the instructions and comprising:
storing one or more video data captured by a camera, wherein the video data is not stored in the form of a plurality of video fragments;
receiving a search request from a video monitoring apparatus connected to the video transmission apparatus through a network;
searching the video data and extracting in real time the plurality of video fragments from only a required section of the video data that satisfy the received search request;
generating a transmission packet comprising the extracted video fragments; and
transmitting the generated transmission packet to the video monitoring apparatus,
wherein a first one of the video fragments is extracted from one set of the stored one or more video data, while a second one of the video fragments is extracted from another set of the stored video data.

19. The video transmission method of claim 18, wherein the search request comprises a plurality of search times related to the video data, the extraction of the video fragments from the video data comprises extracting a plurality of video fragments corresponding to the search times, and the video fragments are extracted from a plurality of video data stored at different times or on different dates.

20. The video transmission method of claim 18, wherein the search request comprises a specific event related to the video data, and the extraction of the video fragments from the video data comprises extracting a plurality of video fragments in which the specific event occurs.

* * * * *